US009766657B2

(12) United States Patent
Moore (10) Patent No.: US 9,766,657 B2
(45) Date of Patent: Sep. 19, 2017

(54) INTEGRATED POWER-SECURITY CABLE DEVICE (71) Applicant: HEWLETT-PACKARD DEVELOPMENT COMPANY, L.P., Houston, TX (US)

(72) Inventor: Earl W Moore, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/023,591

(22) PCT Filed: Nov. 1, 2013

(86) PCT No.: PCT/US2013/067945
§ 371 (c)(1),
(2) Date: Mar. 21, 2016

(87) PCT Pub. No.: WO2015/065466
PCT Pub. Date: May 7, 2015

(65) Prior Publication Data
US 2016/0246329 A1 Aug. 25, 2016

(51) Int. Cl.
H02B 1/20 (2006.01)
G06F 1/16 (2006.01)
H01R 13/627 (2006.01)
H01R 13/639 (2006.01)
E05B 73/00 (2006.01)

(52) U.S. Cl.
CPC ........ *G06F 1/1633* (2013.01); *E05B 73/0005* (2013.01); *G06F 1/1635* (2013.01); *H01R 13/6273* (2013.01); *H01R 13/6397* (2013.01); *E05B 73/0082* (2013.01); *H01R 2201/06* (2013.01)

(58) Field of Classification Search
CPC . G06F 1/1633; G06F 1/1635; H01R 13/6273; H01R 13/6397; H01R 2201/06; E05B 73/0082; E05B 73/0005
USPC ...... 361/679.01, 679.02, 801, 803, 825, 826
See application file for complete search history.

(56) References Cited

U.S. PATENT DOCUMENTS 4,308,730 A 1/1982 Roth
4,985,695 A 1/1991 Wilkinson et al.
5,085,594 A * 2/1992 Kaelin ................. H01R 4/5033
439/427

(Continued)

FOREIGN PATENT DOCUMENTS

CN 101211200 A 7/2008

OTHER PUBLICATIONS

Sorrel; "GameDr Video Game Timer Teaches Kids to Hack", <http://bestniagra.com/Best-Laptops-2012/Dell-Vostro-V13/>, Jan. 6, 2009.

*Primary Examiner* — Hung S Bui
(74) *Attorney, Agent, or Firm* — HP Patent Department (57) ABSTRACT An integrated power-security cable device usable with a computing device includes an integrated power-security cable. The integrated power-security cable device includes a security cable to secure the computing device to an object, a power cable to provide power to the computing device, and a covering member surrounding the security cable and the power cable. The integrated power-security cable device is connected to an integrated electrical connector including a security lock to lock the integrated electrical connector to the computing device.

15 Claims, 6 Drawing Sheets

(56) References Cited

U.S. PATENT DOCUMENTS

| | | |
|---|---|---|
| 5,169,326 A | 12/1992 | Werner |
| 5,190,466 A | 3/1993 | McVey |
| 5,812,356 A * | 9/1998 | O'Connor ............. G06F 1/1632 335/179 |
| 6,049,045 A | 4/2000 | Becker et al. |
| 6,297,963 B1 | 10/2001 | Fogle |
| 6,389,853 B1 | 5/2002 | Pate et al. |
| 6,401,502 B1 * | 6/2002 | Yang ................... E05B 67/003 70/14 |
| 6,799,981 B1 * | 10/2004 | Yu ...................... H01R 13/6397 439/133 |
| 6,971,255 B2 | 12/2005 | Bhogal et al. |
| 7,121,853 B1 | 10/2006 | Gast |
| 7,549,308 B2 * | 6/2009 | Avganim ............ E05B 73/0005 70/14 |
| 7,857,654 B2 | 12/2010 | West et al. |
| 8,684,760 B1 * | 4/2014 | Lam .................. H01R 13/6276 174/135 |
| 9,391,403 B2 * | 7/2016 | Ahn ....................... G06F 21/85 |
| 2003/0200775 A1 * | 10/2003 | Yu ....................... E05B 37/0003 70/58 |
| 2005/0039502 A1 | 2/2005 | Avganim |
| 2005/0157460 A1 | 7/2005 | Bhogal et al. |
| 2007/0004265 A1 | 1/2007 | Yeh |
| 2011/0072862 A1 | 3/2011 | Avganim et al. |
| 2012/0262860 A1 | 10/2012 | Seibert et al. |

\* cited by examiner

INTEGRATED POWER-SECURITY CABLE DEVICE

BACKGROUND

Multiple cables may be removably coupled to computing devices. For example, power cords may removably connect to computing devices to provide power thereto. Additionally, security cables may removably connect to computing devices to secure the commuting devices to respective objects.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

Multiple cables such as power cables and security cables may be removably coupled to computing devices such as laptop computers, and the like. A power cord may removably connect to computing devices to provide power thereto. That is, the power cord may connect a power source to a respective computing device. A security cable may removably connect a computing device such as a laptop computer to an object to secure it thereto. The use of multiple cables with mobile computers at a remote location, a docking station, and the like, however, may be cumbersome, negatively impact the user experience, and require additional space on the competing device to receive the multiple cables.

In examples, an integrated power-security cable device usable with a computing device includes an integrated power-security cable and an integrated electrical connector. The integrated power-seurity cable includes a security cable to secure the computing device to an object, a power cable to provide power to the computing device, and a covering member surrounding the security cable end the power cable. The integrated electrical connector includes a latch member to connect to the computing device, a security lock to lock the latch member to the computing device, and at least one electrical contact to connect to and establish an electrical connection with the computing device. The integrated electrical sxmnecfor includes a first connector end connected to a first end of the integrated power-security cable and a second cable and a second connector end to connect to the computing device. Thus, an integrated power-security cable device enables fee user to secure a computing device when plugging in power into single area of the computing device. Additionally, transporting two separate cable devices to power and secure the computing device is avoided. Accordingly, the integrated power-security cable device may be convenient, positively impact the user experience, and reduce the need for additional space on the computing device to receive the integrated power-security cable device when used at a remote location, a docking station, and the like.

Figure 1:
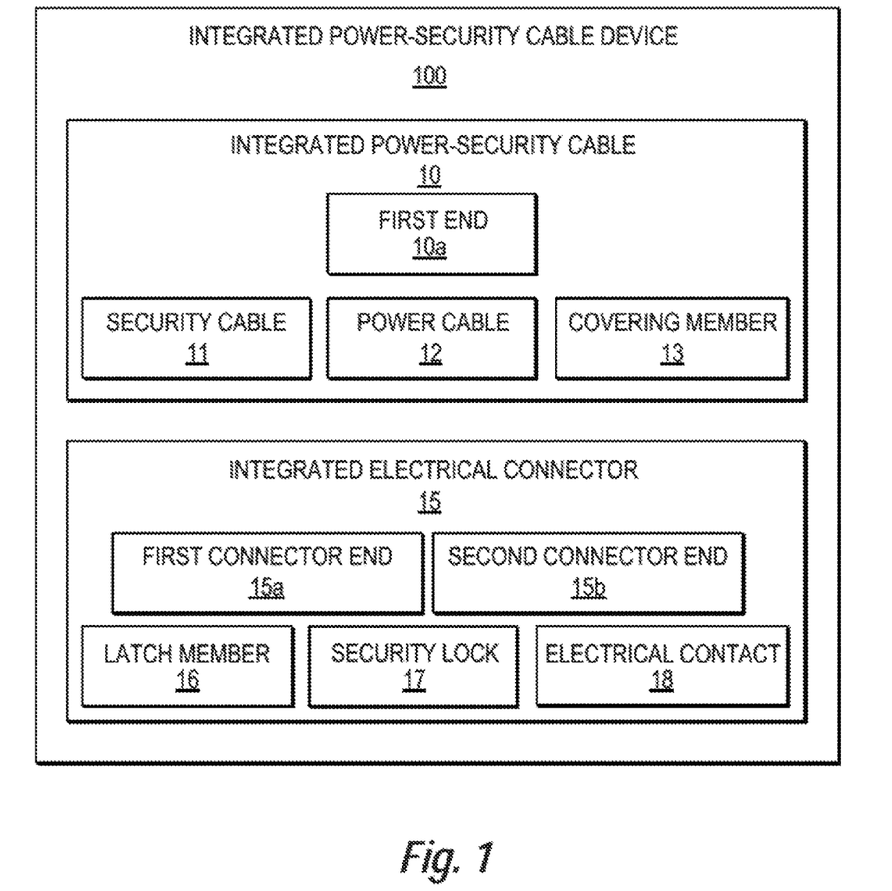
FIG. 1 is a block diagram illustrating an integrated power-security cable device according to an example.

FIG. 1 is a block diagram illustrating an integrated power-security cable device according to an example. The integrated power-security cable device 100 may be usable with a computing device. Referring to FIG. 1, in some examples, the Integrated power-security cable device 100 includes an integrated power-security cable 10 and an integrated electrical connector 15. The integrated power-security cable 10 Includes a first end 10a a power cable 12, a security cable 11, and a covering member 13 surrounding the security cable 11 and the power cabie 12. The power cable 12 may provide power to the computing device. The security cabie 11 may secure the computing device to an object. The object, for example, may be a heavy piece of furniture, and the like, to anchor the computing device when the integrated power-security cabie device 100 is coupled there between.

Referring to FIG. 1, in some examples, the integrated electrical connector 15 includes a first connector end 15a, a second connector end 15b, a latch member 16, a security lock 17, and at least one electrical contact 18. The latch member 16 may connect to the computing device. The security lock 17 may lock the latch member 16 to the computing device. The at least one electrical contact 13 may connect to and establish an electrical connection with the computing device. The first connector end 15a of the integrated electrical connector 15 may be connected to the first end 10a of the integrated power-security cable 10, and the second connector end 15b of the integrated electrical connector 15 may connect to the computing device. For examples, the computing device may include a retention connector to be connected to the integrated electrical connector 15. In some examples, the integrated power-security cable 10 and the integrated electrical connector 15 may be integrally-formed.

Figure 2:
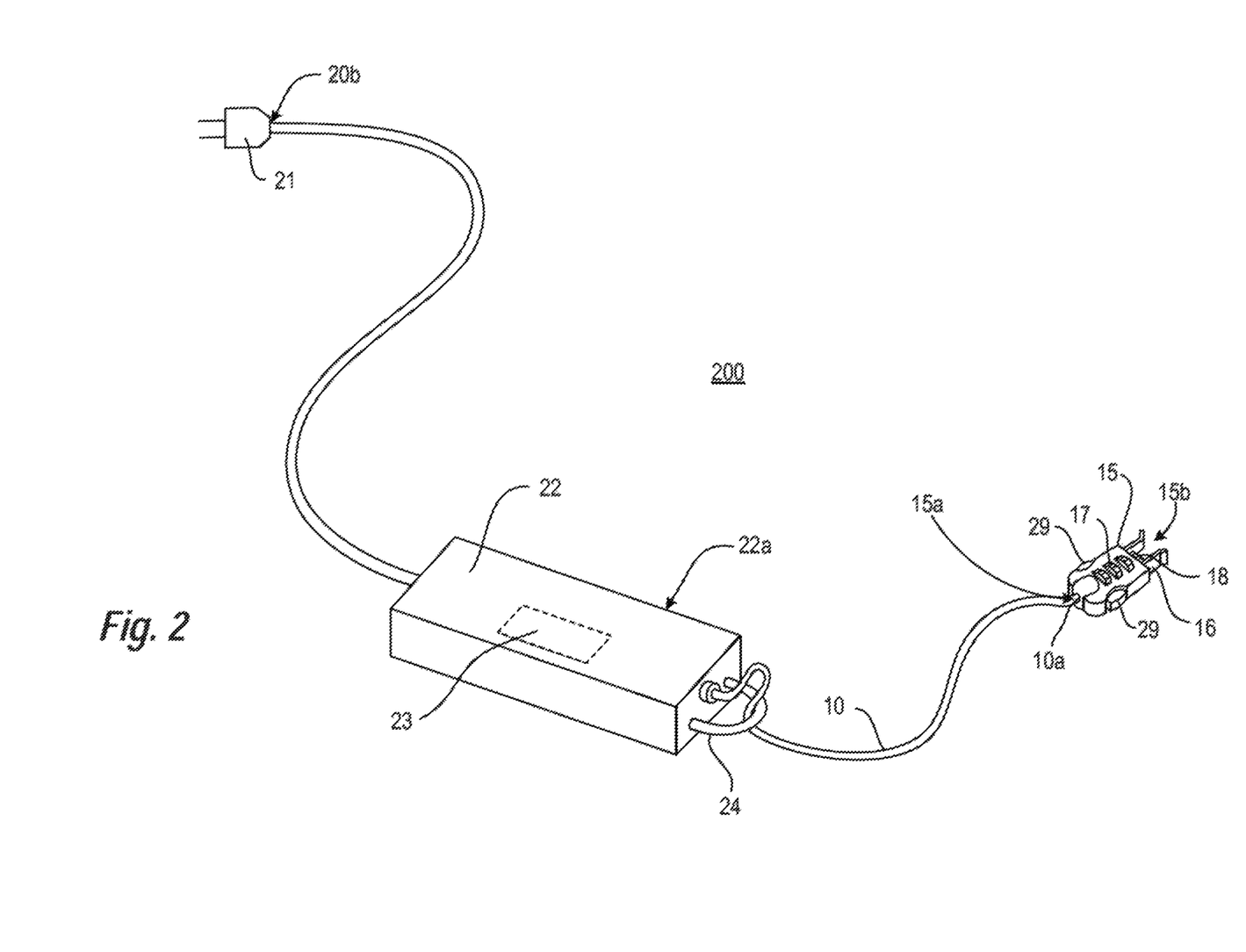
FIG. 2 is a schematic view illustrating an integrated power-security cable device according to an example.
Figure 3:
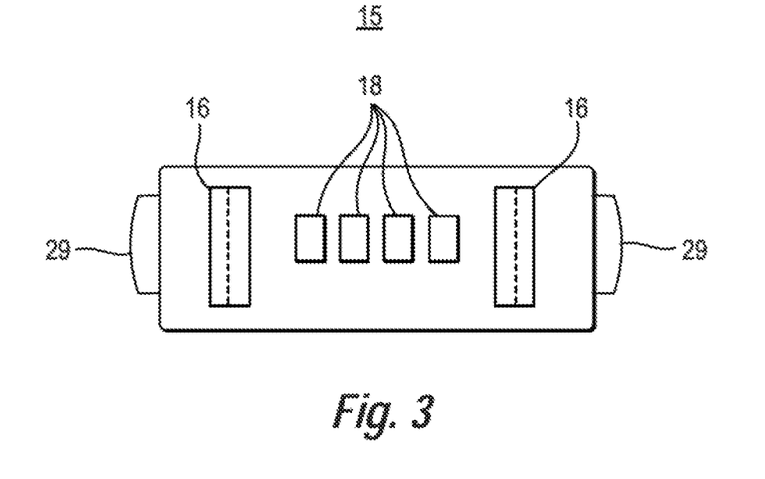
FIG. 3 is a front view illustrating an integrated electrical connecter of the integrated power-security cable device of FIG. 2 according to an example.
Figure 4A:
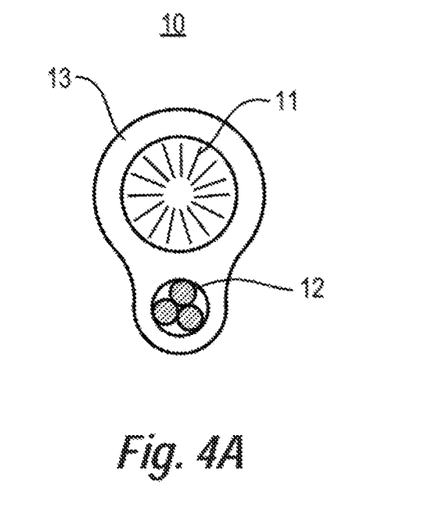
FIGS. 4A and 4B are cross-sectional views of the integrated power-security cable device of FIG. 2 according to examples.
Figure 4B:
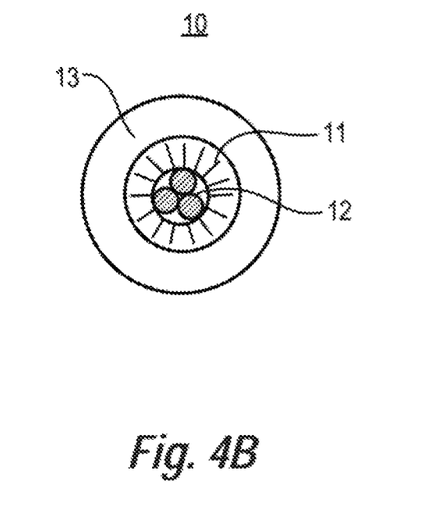

FIG. 2 is a schematic view illustrating an integrated power-security cable device according to an example. FIG. 3 is a front view of an electrical connector of the integrated power-security cable device of FIG. 2 according to an example. FIGS. 4A and 4B are cross-sectional views of the integrated power-security cable device of FIG. 2 according to examples. Referring to FIGS. 2-4B, in some examples, an integrated power-security cable device 200 may include the integrated power-security cable 10 and the integrated electrical connector 15 as previously described with respect to the integrated power-security cable device 200 of FIG. 1.

Referring to FIGS. 2-4B, in some examples, an integrated power-security cable device 200 may also include a second end 20b, an electrical plug 21, and an intermediate electrical device 22. The electrical plug 21 may be connected to the second end 20b of the integrated power-security cable 10. The electrical plug 21 may also removably connect to a power source such as an alternating current (AC), and the like. The intermediate electrical device 22 may include an intermediate housing 22a, at least one electrical component 23 disposed in the intermediate housing 22a, and a securing member 24 coupled to the intermediate housing 22a. The at least one electrical component 23 may include an electrical circuit connected to the power cable 12, for example, to transform AC to direct current (DC) to be supplied to the computing device. For example, the intermediate electrical device 22 may be an AC power brick. In some examples, the security cable 11 may pass through the intermediate housing 22a. That is, the security cable 11 may pass through the intermediate housing 22a without the security cable 11 being detached from itself. In some examples, the securing member 24 may include a U-shaped metal member. For example, the securing member 24 may form an opening 1or the integrated power-security cable 10 to pass through.

Referring to FIGS. 2-4B, in some examples, the integrated electrical connector 15 may include at least one electrical contact 18, a latch member 18, a security lock 17, and a latch release member 29. The at least one electrical contact 18 may connect to and establish an electrical connection with the computing device. In some examples, the electrical contact 18 may include a plurality of electrical contacts, for example, to transfer power to the computing device. The latch member 18 may include a plurality of latch members to connect the integrated electrical connector 15 to the computing device. The integrated electrical connector 15 may include two latch members. In some examples, the computing device may include a retention connector to connect to the integrated electrical connector 15.

The security lock 17 may include a combination lock having a locking state to retain the connection between the latch members 16 and the computing device, and an unlocking state to release the connection between latch members 16 and the computing device. For example, the combination lock may include a plurality of selectable members to select a unique code to place the combination lock in the unlocking state to enable the latch members 16 to be released (e.g., unlocked) from the computing device such as a retention connector of the computing device.

Referring to FIG. 4A, in some examples, the integrated power-security cable 10 may include the security cable 11 and the power cable 12 disposed along-side each other. Additionally, the security cable 11 and power cable 12 may be encased by the covering member 13. Referring to FIG. 4B, in some examples, the integrated power-security cable 10 may include the power cable 12 disposed in a longitudinal opening through the security cable 11. Additionally, the security cable 11 and power cable 12 may be encased by the covering member 13. In some examples, the security cable 11 may include steel, for example, to deter the unwanted cutting of the security cable 11 and theft of the computing device to which the integrated power-security cable 10 is attached.

Figure 5:
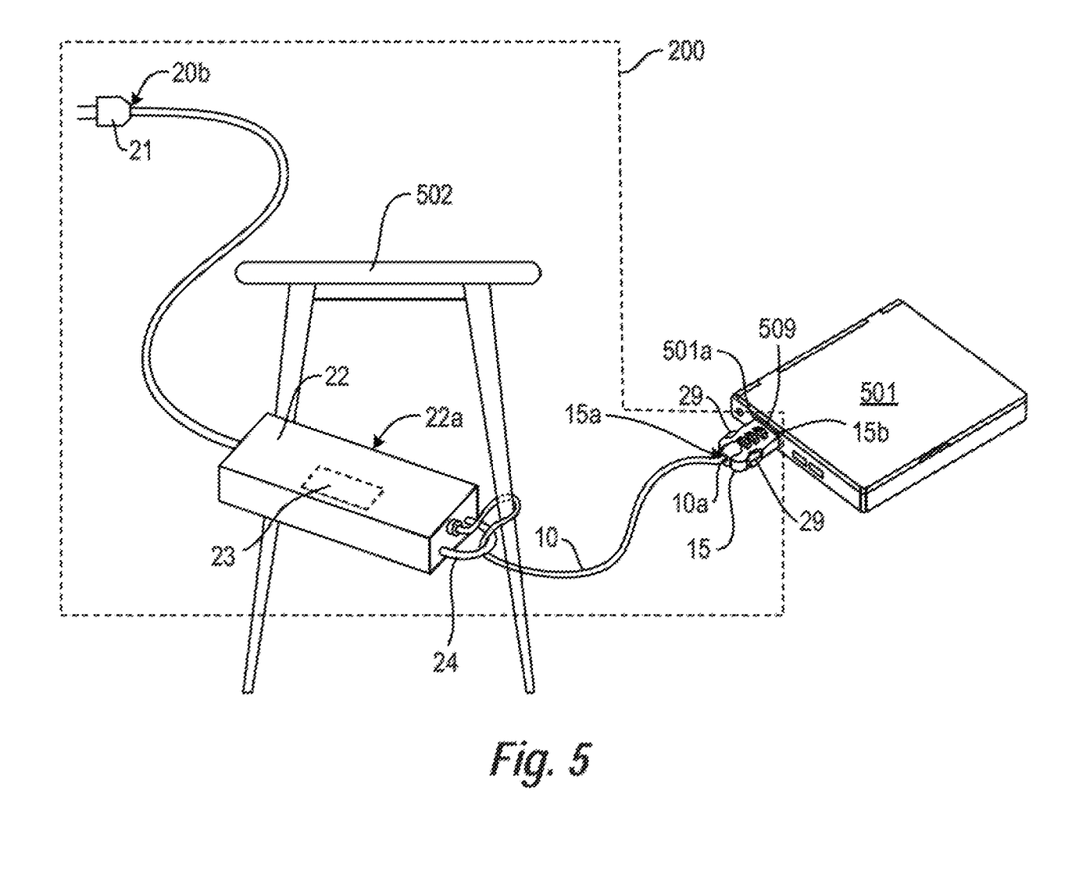
FIG. 5 is a schematic diagram illustrating a computing device according to an example.
Figure 6:
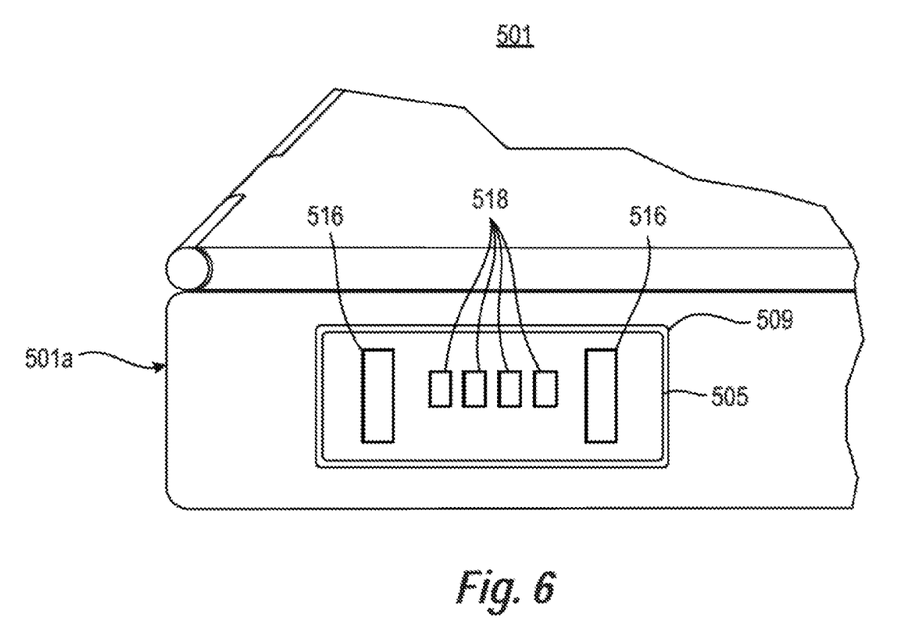
FIG. 6 is a front view of a retention connector of the computing device of FIG. 5 according to an example.

FIG. 5 is a schematic diagram illustrating a computing device according to an example. FIG. 6 is a front view of a retention connector of the computing device of FIG. 5 according to an example. Referring to FIGS. 5 and 6, in some examples, a computing device 501 includes a computing housing 501a, a retention connector 509, and an integrated power-security cable device 200. The computing housing 501a includes a computing electrical connector 505. The retention connector 509 may connect to the computing electrical connector 505 and the computing housing 501a. The integrated power-security cable device 200 includes an integrated power-security cable 10, an electric plug 21, an intermediate electrical device 22, and an integrated electrical connector 15. The integrated power-security cable 10 includes a first end 10a, a second end 10b, a security cable 11 (FIGS. 4A, and 4B), a power cable 12 (FIGS. 4A, and 4B), and a covering member 13 (FIGS. 4A, and 4B).

The security cable 11 may secure the computing device 501 to an object 502 such as a desk, furniture, and the like. For example, the object 502 may act as an anchor to deter the computing device 501 from an unauthorized removal such as computer theft. The power cable 12 may provide power to the computing device 501. The covering member 13 may surround the security cable 11 and the power cable 12. In some examples, the covering member 13 may include an electrically, non-conductive material. The electrical plug 21 may be connected to the second end 20b of the integrated power-security cable 10, for example, to connect a power source to the computing device 501. In some examples, the intermediate electrical device 22 may include an intermediate housing 22a, at least one electrical component 23 disposed in the intermediate housing 22a, and a securing member 24 coupled to the intermediate housing 22a.

Referring to FIGS. 5 and 6, in some examples, the integrated electrical connector 15 includes a first connector end 15a, a second connector end 15b, a latch member 16 (FIG. 3), a security lock 17, and at least one electrical contact 18. The latch member 16 may connect to the retention connector 509. The security lock 17 may lock the latch member 16 to the retention connector 509 securely fastened to and/or part of the computing device 501. For example, the retention connector 509 may include a bracket portion 509a and an electrical connector portion 509b. The bracket portion 509a may surround the electrical connector portion 509b, include latch receivers 516 such as apertures to receive corresponding latch members 16 from the integrated electrical connector 15, and be securely fastened to the computing housing 501a.

The electrical connector portion 509b may attach to and electrically connect the integrated electrical connector 15 and the computing electrical connector 505. In some examples, the retention connector 500 may include a custom sheet-metal bracket to receive the latch member 16 from the integrated electrical connector 15. The retention connector 509 may be part of and/or securely fastened to the computing housing 501a, for example, in a manner in which a printed circuit board (pcb) of the computing device 501 does not retain the integrated power-security cable 10. Thus, the pcb may not sustain damage in the event of the integrated power-security cable 10 being yanked or mishandled. In some examples, the retention connector 509 may surround the electrical connector portion 509b to enable it to receive the at least one electrical contact 18 of the integrated electrical connector 15. In some examples, the brocket portion 509a and the electrical connector portion 509b may be integrally-formed or individual unitary members.

Referring to FIGS. 5 and 6, in some examples, the at least one electrical contact 18 may connect to and establish an electrical connection with the computing electrical connector 505 through the retention connector 509. For example, the retention connector 509 may also include contact receivers 518 such as electrical slots to receive corresponding electrical contacts 18 from the integrated electrical connector 15. In some examples, the electrical contacts 18 of the integrated electrical connector 15 may be push pins. The first connector end 15a of the integrated electrical connector 15a may be connected to the first end 10a of the integrated power-security cable 10. In some examples, the integrated power-security cable 10 and the integrate electrical connector 15 may be integrally-formed. Additionally, the second connector end 15b of the integrated electrical connector 15 may connect to the retention connector 509 securely connected to the computing electrical connector 505.

As previously described with respect to the integrated power-security cable 10 illustrated in FIG. 4A, in some examples, the security cable 11 and the power cable 12 may be disposed along-side each other and encased by the covering member 13. As previously described with respect to the integrated power-security cable 10 illustrated in FIG. 4B, in some examples, the power cable 12 may be disposed in a longitudinal opening through the security cable 11. Additionally, the security cable 11 and power cable 12 may be encased by the covering member 13. The security lock 17 may include a combination lock. The computing device 501 may also include an intermediate electrical device 22 including an intermediate housing 22a, at least one electrical component 23 disposed in the intermediate housing 22a, and a securing member 24 coupled to the intermediate housing 22a.

Figure 7:
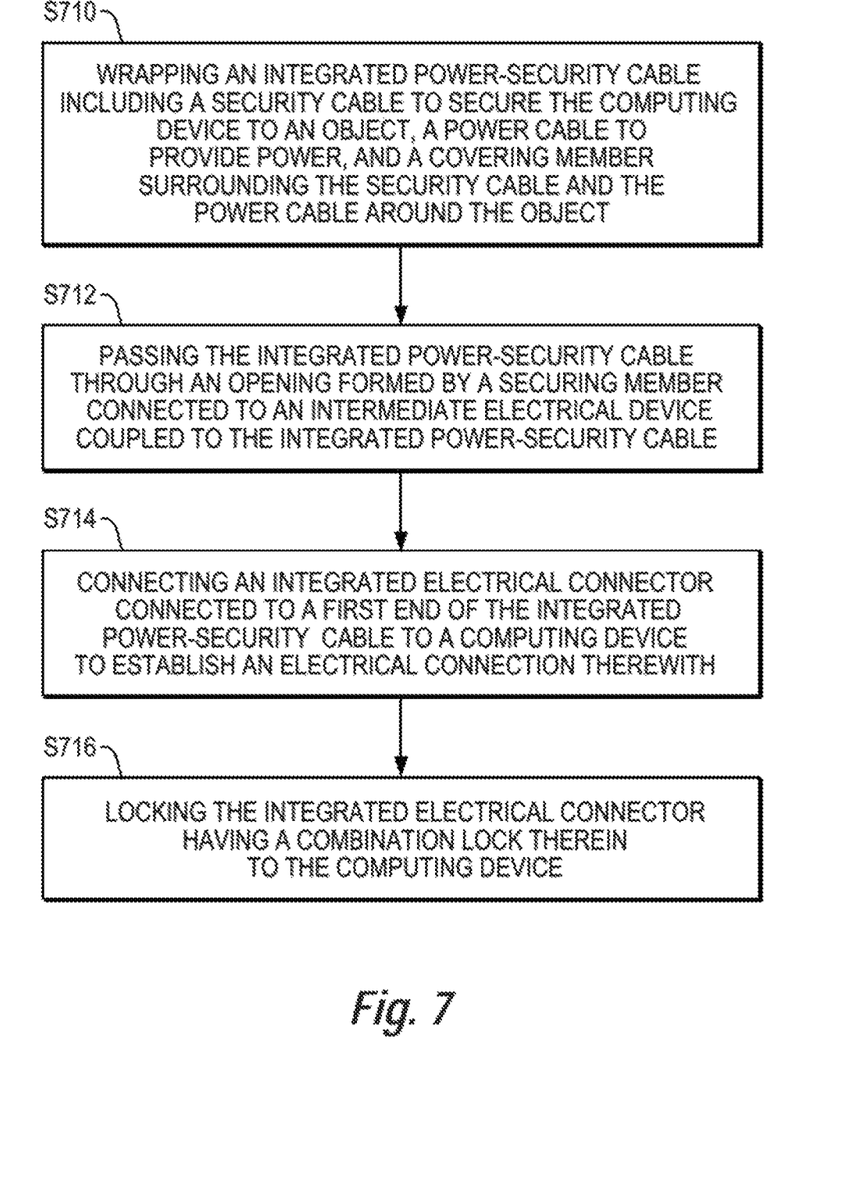
FIG. 7 is a method of securing a competing device to an object according to an example.

FIG. 7 is a method of securing a computing device to an object according to an example. In some examples, the modules and/or assemblies implementing the method may be those described in relation to the integrated power-security cable device 100 and 200 of FIGS. 1-6. Referring to FIG. 7, in block S710, an integrated power-security cable including a security cable to secure the computing device to an object, a power cable to provide power, and a covering member surrounding the security cable and the power cable is wrapped around the object. In block S712, the integrated power-security cable is passed through an opening formed by a securing member connected to an intermediate electrical device coupled to the integrated power-security cable. In block S714, an Integrated electrical connector connected to a first end of the integrated power-security cable is connected to a computing device to establish an electrical connection therewith. For example, the integrated electrical connector may be connected to a retention connector of the computing device. In block S716, the integrated electrical connector having a combination lock therein is locked to the computing device. For example, the integrated electrical connector may he locked to the computing device through a retention connector of the computing device.

It is to be understood that the flowchart of FIG. 7 illustrates architecture, functionality, and/or operation of examples of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart of FIG. 7 illustrates a specific order of execution, the order of execution may differ from that which is depicted. For example, the order of execution of two or more blocks may be rearranged relative to the order illustrated. Also, two or more blocks illustrated in succession in FIG. 7 may be executed concurrently or with partial concurrence. All such variations are within the scope of the present disclosure.

The present disclosure has been described using non-limiting detailed descriptions of examples thereof that are not intended to limit the scope of the general inventive concept. It should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the general inventive concept and which are described for illustrative purposes. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. An integrated power-security cable device usable with a computing device, the integrated power-security cable device comprising:
    a security cable to secure the computing device to an object, a power cable to provide power to the computing device, and a covering member surrounding the security cable and the power cable;
    an integrated electrical connector including a first connector end connected to a first end of the power security cable and a second connector end connectable to the computing device;
    a plurality of latch members including a first latch member and a second latch member to connect the integrated electrical connector to the computing device;
    a security lock to lock the plurality of latch members to the computing device; and
    at least one electrical contact between the first latch member and the second latch member to connect to and establish an electrical connection with the computing device, wherein the at least one electrical contact extends a first distance from the second connector end, wherein the first latch member and the second latch member extend a second distance from the second connector end, and wherein the second distance is greater than the first distance.

2. The integrated power-security cable device of claim 1, further comprising:
    an electrical plug connected to a second end of the integrated power-security cable.

3. The integrated power-security cable device of claim 1, wherein the security cable and the power cable are disposed along-side each other and encased by the covering member.

4. The integrated power-security cable device of claim 1, wherein the power cable is disposed in a longitudinal opening through the security cable, and the security cable and power cable are encased by the covering member.

5. The integrated power-security cable device of claim 1, wherein the covering member comprises an over-molded jacket.

6. The integrated power-security cable device of claim 1, wherein the security cable comprises steel.

7. The integrated power-security cable device of claim 1, wherein the security lock comprises a combination lock.

8. The integrated power-security cable device of claim 1, further comprising:
    an intermediate electrical device comprising:
    an intermediate housing;
    at least one electrical component disposed in the intermediate housing; and
    a securing member coupled to the intermediate housing.

9. The integrated power-security cable device of claim 8, wherein the securing member comprises a U-shaped metal member.

10. A computing device, comprising:
    a computing housing including a computing electrical connector;

a retention connector to connect to the computing electrical connector and the computing housing;

an integrated power-security cable including a security cable to secure the computing device to an object, a power cable to provide power to the computing device, and a covering member surrounding the security cable and the power cable;

an integrated electrical connector including a first connector end connected to a first end of the power security cable and a second connector end connected to the retention connector;

a plurality of latch members including a first latch member and a second latch member to connect to the retention connector, a security lock to lock the plurality of latch members to the retention connector, and at least one electrical contact between the first latch member and the second latch member to connect to and establish an electrical connection with the retention connector, wherein the at least one electrical contact extends a first distance from the second connector end, wherein the first latch member and the second latch member extend a second distance from the second connector end, and wherein the second distance is greater than the first distance.

11. The computing device of claim 10, wherein the power cable is disposed in a longitudinal opening through the security cable, and the security cable and power cable are encased by the covering member.

12. The computing device of claim 10, wherein the security lock comprises a combination lock.

13. The computing device of claim 10, further comprising:

an intermediate electrical device comprising:
an intermediate housing;
at least one electrical component disposed in the intermediate housing; and
a securing member coupled to the intermediate housing.

14. An integrated power-security cable including:
a security cable to secure a computing device to an object;
a power cable to provide power to the computing device;
a covering member surrounding the security cable and the power cable,
an intermediate electrical device having a securing member;
an electrical plug coupled to a first end of the integrated power-security cable;
an integrated electrical connector including a first connector end connected to a second end of the integrated power-security cable and a second connector end connectable to the computing device;
an electrical contact extending from the second connector end at a first distance;
a first latch member and a second latch member extending from the second connector end at a second distance, wherein the electrical contact is positioned between the first latch member and the second latch member;
a security lock securing the first latch member and the second latch member to the computing device; and
a latch release member to release the first latch member and the second latch member from the computing device when the security lock is in an unlocked position.

15. The integrated power-security cable of claim 14, wherein the second distance is longer than the first distance.

* * * * *